Dec. 31, 1957  J. C. BECKETT ET AL  2,817,958
ABSORPTION SYSTEM FOR HEATING OR COOLING A SPACE
Filed Aug. 2, 1955  3 Sheets-Sheet 1

WINTER

SUMMER

INVENTORS:
JOHN C. BECKETT
WILLIAM WESLEY HICKS
BY Flam and Flam
ATTORNEYS.

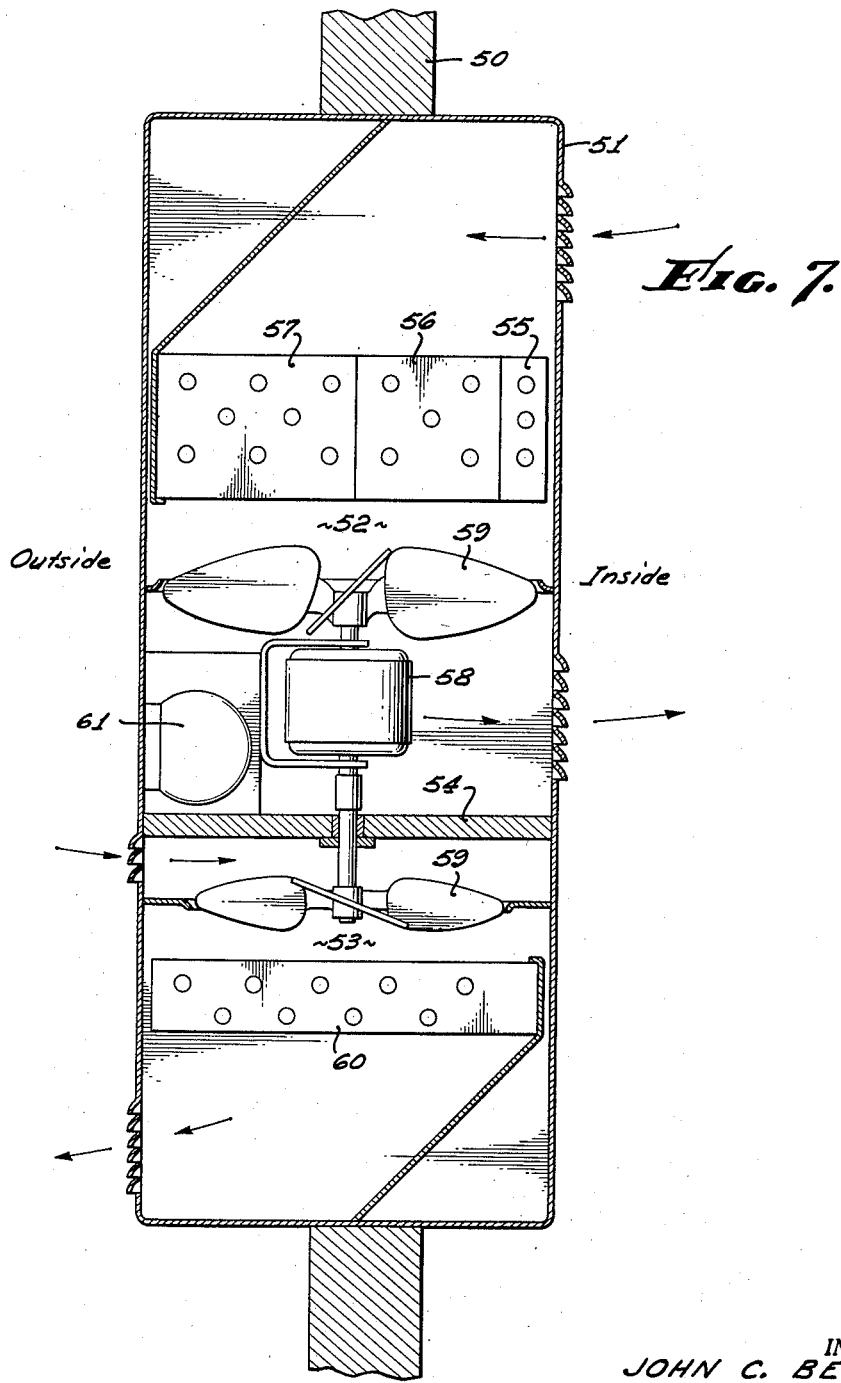

United States Patent Office 2,817,958
Patented Dec. 31, 1957

2,817,958
ABSORPTION SYSTEM FOR HEATING OR COOLING A SPACE

John C. Beckett, Kentfield, and William Wesley Hicks, San Francisco, Calif., assignors to Wesix Electric Heater Co., San Francisco, Calif., a corporation of California Application August 2, 1955, Serial No. 526,006

1 Claim. (Cl. 62—119)

This invention relates generally to air-conditioning, and more particularly to a system utilizing a refrigerant and a solvent for the refrigerant, circulated in a well-known manner to pass heat into or out of a space or room to be heated or cooled.

In such a system embodying this invention, there is employed an evaporator for the refrigerant, which is substantially devoid of the solvent, and which extracts heat from air. By causing the evaporated refrigerant to be absorbed in the solvent, at least a part of the heat content of the refrigerant is imparted to the solution; and in turn, an air stream is placed in heat-receiving position with the solution, as by a heat exchanger through which the solution passes.

In order to separate the refrigerant from the solvent, this strong solution passing out of the absorber is conducted through a generator or still, to which heat is applied, so as to vaporize the refrigerant. The vaporized refrigerant is then condensed, to be passed into the evaporator.

Such a system, in the winter or during cold weather, serves very effectively to "pump" heat into a room, by passing outside air over the evaporator, usually in the form of piping having fins to facilitate transfer of heat to the refrigerant and to vaporize it. In this step of the process, a reduction of the weather air by 10° F. through such transfer forms a very efficient means of adding heat to a room. To the room or inside air is passed the heat occasioned by the action of the absorber and by condensation of the refrigerant due to the artificial heating of the solution. Obviously, if the positions of the inside air and the outside air be interchanged, the system can be used for cooling the inside air.

Heating pumps, using a conventional refrigerating system including a compressor, have heretofore been suggested and are on the market. Although more efficient from the standpoint of heat transfer, such systems are bulky and the first cost is very high. This is due to the necessity of using relatively large electric motors for driving the compressors; and there is a further serious disadvantage in such systems because they are noisy, and additional expense may be required for sound insulation. It is accordingly another object of this invention to provide a relatively inexpensive installation that is quiet and that has a tolerable overall efficiency.

Another prior method of electric heating involves the use of resistances. Such resistance systems have the advantage of simplicity and relatively low first cost. However, the power consumption is relatively high; and this militates against its use in localities where electrical energy rates are high. It is another object of this invention to provide a heating system that can be operated at an efficiency higher than resistance heating, so as to make possible an economical use of electrical energy.

The system of this invention is particularly applicable to decentralized operation, independent units being capable of ready installation in connection with each room desired to be heated or cooled. In a compressor-motor type of system, on the other hand, installation of a single central unit for the entire dwelling is often desirable, in order to isolate the noise of the motor and compressor from the rooms being heated or cooled. Due to such centralization, the overall efficiency of the system is reduced. However, when utilizing the system of this invention, decentralization, using units in the rooms where needed is entirely practical from the standpoint of quietness, and the efficiency is maintained. The efficiency thus obtained compares quite favorably to that of a centralized compressor-pump system.

It is still another object of this invention to make it possible to provide units so compact as to be readily accommodated in wall structures without needing unsightly window installations. By the aid of this invention, the unit can be hidden in the wall, except for inlet and outlet registers. Enclosing the unit in a wall structure in this manner poses no serious problem of maintenance and servicing because no compressor or large motor is used.

Houses are usually supplied with alternating current power. In the event of a temporary shutdown, the load may be left connected, and upon re-establishment of the service, an initial inrush of current results. This inrush, although temporary, may make it difficult to maintain the circuit breakers in closed position. By the aid of the present invention, these effects are minimized, since the load is non-inductive, and has a high power factor starting current approximately the same as the running current.

Accordingly, it is another object of this invention to insure against disadvantageous conditions upon resumption of interrupted service. This is especially important for power utility companies, and probably conducive to the establishment of lower rates for such loads.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claim.

Referring to the drawings.

Figure 2:
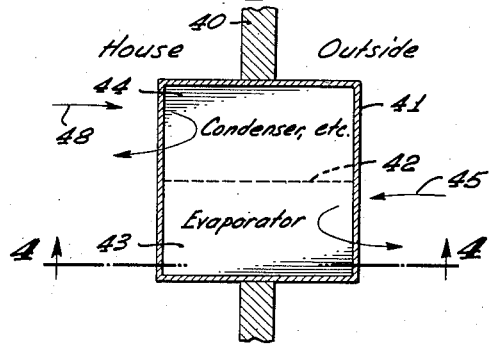
Figs. 2 and 3 are diagrammatic views illustrating another manner in which the system may be used for either warming or cooling room air.
Figure 3:
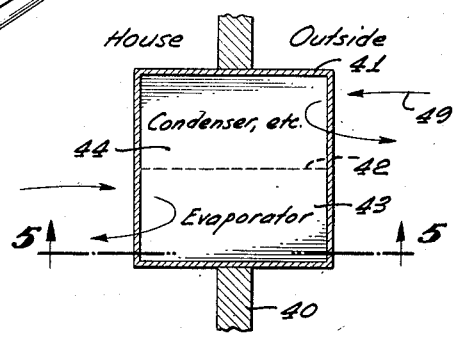
Figure 4:
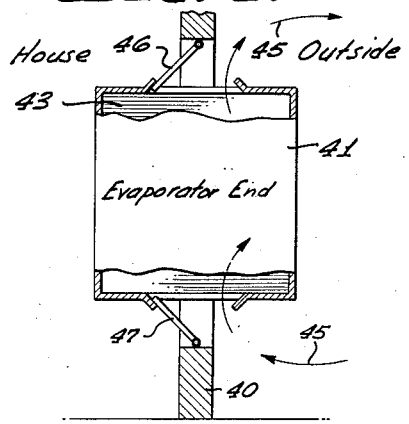
Figure 5:
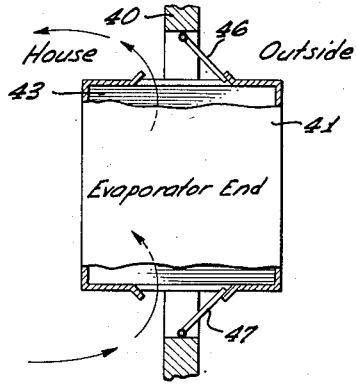
Figure 6:
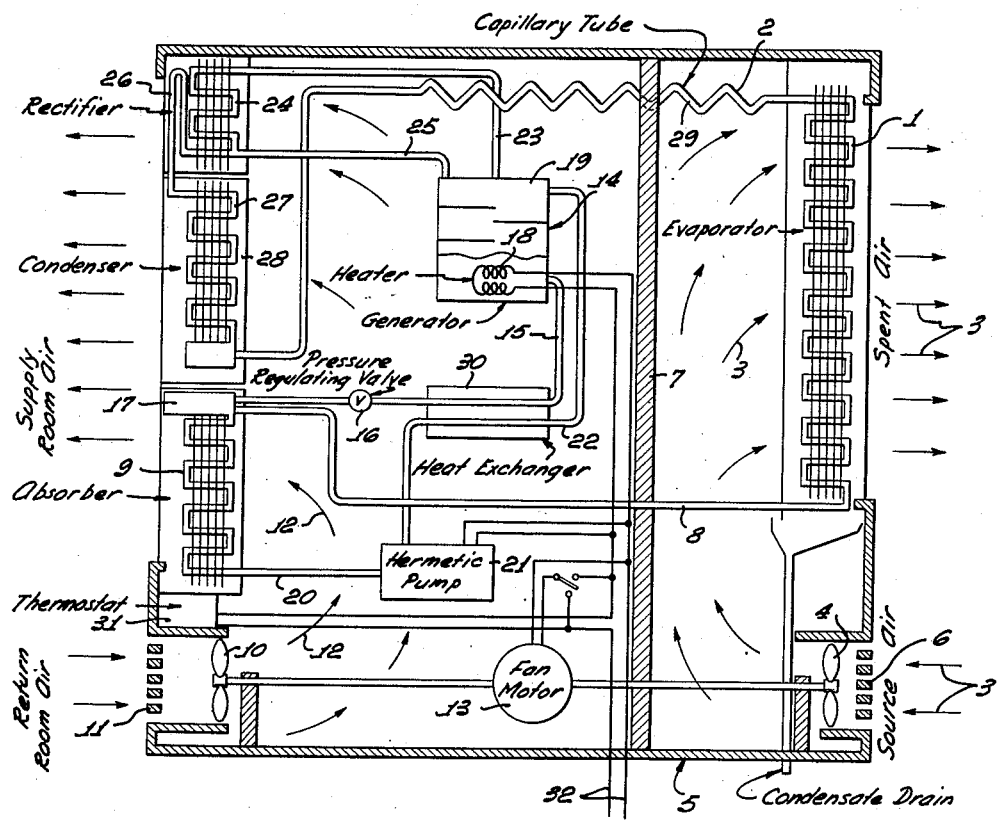

Figs. 4 and 5, respectively, are diagrammatic views taken along planes corresponding to lines 4—4 and 5—5 of Figs. 2 and 3;

Fig. 6 is a diagrammatic representation of the system embodying the invention; and Fig. 7 is a sectional view, mainly diagrammatic, of still another modified form of the invention shown as installed in a wall.

The operation of the system may be best described in connection with Fig. 6. An evaporator coil 1 is intended to receive a liquid refrigerant through a capillary tube 2. This coil 1 may be provided with external fins to facilitate transmission of heat to the refrigerant from a stream of air indicated by the arrows 3. This stream of air is produced by the aid of a fan structure 4 disposed below the coil 1 and drawn into the housing 5 encircling the apparatus, through an apertured wall 6 of the housing.

Since the system will be described for the purpose of pumping heat into a room or house, the air flow represented by the arrows 3 is in the direction from weather air, first past the fan 4, then past the coil 1, and finally outwardly to be returned to the weather air.

The refrigerant used for this purpose may be of the well-known type of refrigerant compounds such as Freon-21 or 22, both of which are non-toxic. The refrigerant selected must be soluble in the solvent selected, and the combination must display a large deviation from Raoult's Law when heated in order to obtain efficient operation.

The temperature of the stream of air passing through the apparatus indicated by the arrows 3 is first increased by the turbulence produced by the fan 4. A portion of the heat content of the air is then utilized to evaporate the refrigerant in the evaporator 1. Cooled air is then passed outwardly of the housing 5.

Although the drop in air temperature between the inlet 6 and the outlet may be quite small, it is sufficient to extract substantial heat from the external air. A temperature difference as little as 10° F. is practicable for this purpose even if this outside air enters the apparatus at a relatively low temperature, such as 10° to 20° F.

That portion of the apparatus which is concerned with the extraction of heat from the external air is isolated from other elements of the apparatus by a wall 7 of heat insulation material located within the housing 5.

The extraction of heat from the outside air is effective for low weather air temperatures, since the refrigerant has a very low boiling point. In addition, the location of the fan 4 in the stream of air ahead of the evaporator 1 is effective to raise the temperature of the air stream, prior to the evaporation of the refrigerant. In this way, a greater heat absorption is effected.

The evaporated refrigerant passes via conduit 8 to the top tank 17 of an absorber 9 located at the left-hand side of the apparatus. This absorber serves to combine a solvent with the evaporator to form a strong solution. A suitable form of solvent is a glycol, such as dimethyl ether of tetraethylene glycol, but the solvent selected must be suitable for the refrigerant used as described above.

This absorber 9 is provided with a coil, preferably provided with internal and external fins for appropriate heat exchange to a second stream of air.

Since there is evolution of heat in this absorption step, room air is caused to flow past the absorber 9. For this purpose, a fan 10 is utilized drawing air into housing 5 from the room through a grill or louvered opening 11, thence outwardly of the housing 5 through the open left-hand end of housing 5. This second air stream is indicated by arrows 12.

Preferably both fans 4 and 10 are operated by a common electric motor 13. This electric motor is located to the left of the partition 7 so that the heat loss in the motor may also serve to raise the temperature of the air passing into and out of the left-hand space of the housing 5.

The solvent into which the evaporated refrigerant is dissolved is supplied from the lower portion of a generator 14 via conduit 15, and a pressure-regulating valve 16. This conduit 15 leads to the upper tank 17 leading to the coil of the absorber 9.

The generator 14 in this instance includes any appropriate heat source. When electricity is used for heating, the electric heating unit may be either in the form of an immersion heater or of the jacket type. By way of example, there is diagrammatically shown an electrical heating element 18 disposed within a closed tank or container 19. This tank or container is connected to the outlet side of the absorber 9 via conduit 20, a pump 21 operated by an electric motor, and conduit 22 leading to the upper portion of the casing 19. The refrigerant in solution in the solvent is caused to vaporize by the action of the heating element 18. The vapor of the refrigerant is thus substantially entirely separated at this stage from the solvent, the solvent returning, as hereinbefore stated, from the bottom of the tank 19 to the absorber 9 and in a heated condition. This heat serves as well therefore to supplement the heat of absorption taking place in the absorber 9.

The vapors from the generator 14 rise upwardly through conduit 23 to a rectifier-condenser structure. The rectifier is used for the purpose of returning to generator 14 any vagrant solvent that may pass upwardly through the conduit 23. For this purpose, the rectifier includes a few turns 24 leading to a conduit 25, returning to the casing 19. The vaporized refrigerant, however, can proceed upwardly through the trap conduit 26, and thence to the main coil 27 of the condenser 28. In this condenser the refrigerant is condensed into liquid form, with attendant evolution of heat. The stream of air produced by the fan 10 also passes over the finned exterior surface of the rectifier 24 and condenser 28 for transmitting heat into the room.

The liquid refrigerant is then passed through any metering device, such as a capillary tube 29 to the evaporator 1 where the cycle is repeated.

A heat exchanger 30 is provided for passing heat from the hot solvent in conduit 15 to the conduit 22 carrying the strong solution. In this way heat is further conserved.

The circulation of air into and out of the left-hand chamber of housing 5 thus produces a very substantial heating effect, usable within the room or space at the left of housing 5.

The operation of the system may be readily reversed so that room air can enter through the louvered wall 6, and pass outwardly after it is transmitted over the external fins of the evaporator coils. The outside air in this instance is heated by the elements just described, located to the left of the partition 7.

In order to provide an automatic control, a thermostat 31 may be provided in series with the supply main 32.

Substantial efficiency is obtained due to the fact that the heat losses occasioned by operation of the motor 13 and the hermetic pump 21 are utilized to increase the temperature of air passing into and out of the housing 5.

Figure 1:
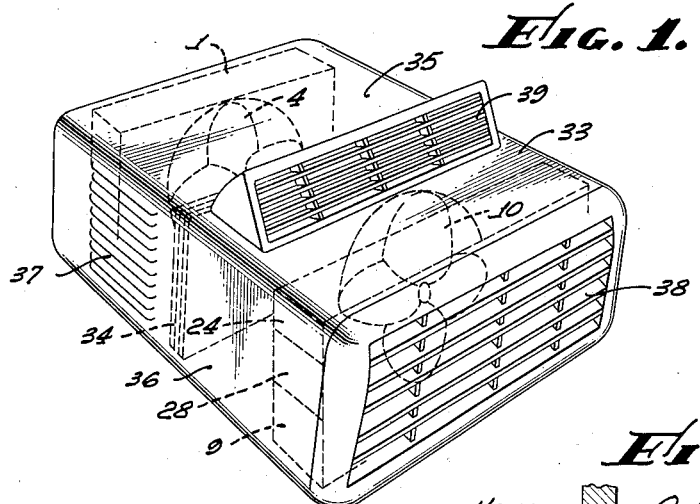
Figure 1 is a pictorial view of an apparatus incorporating the invention.

A compact form of device that may be incorporated in a wall is shown in Fig. 1. Here there is an external casing 33 made of sheet metal. A heat insulation partition 34 separates the interior of the casing into a chamber 35 and a chamber 36. The chamber 35 houses the evaporator unit 1, which faces an opening at the end of the casing 33. The fan 4 is indicated, providing circulation through the evaporator. The inlet openings are formed by the louvered wall 37.

On the room air side, the end wall of the casing is provided with the louvers 38 through which air may be drawn into casing 33, by the fan 10. The rectifier 24, condenser 28 and absorber 9 are also shown in the chamber 36. The outlet to the room is provided by a sloping louvered wall 39 in which louvers are capable of angular adjustment.

Figs. 2 through 4 diagrammatically illustrate a modified form of the present invention. They also illustrate, by way of analogy, the position of the apparatus shown in Fig. 1 for winter and summer operation.

Figs. 2 and 4 illustrate the position of the apparatus for winter operation. The room wall 40 has an aperture in which the housing 41 is located. The housing 41 includes an intermediate partition 42 of insulation material forming an evaporator chamber 43 and another chamber 44 housing all of the other elements of the system.

For operation, outside air is circulated into and out of evaporator chamber 43 as indicated by the arrows 45. This is effected by positioning flap valves 46 and 47 mounted on vertical pivots on the wall structure. Similar flap valves are provided for the circulation of the room air as indicated by the arrows 48.

For summer operation, as shown in Figs. 3 and 5, the positions of the flap valves are reversed so that the evaporator chamber 43 is subjected to room air; and through chamber 44 is circulated the outside air, as indicated by arrows 49.

In Fig. 7 another form of installation utilizing the same elements is diagrammatically illustrated in horizontal section. Here the room wall 50 accommodates a housing 51 separated into chambers 52 and 53 by a heat insulation partition 54.

The chamber 52 includes the rectifier 55, condenser 56 and absorber 57. An electric motor 58 for operating the fan 59 is also indicated. The motor also operates the fan 59 in chamber 53 in which is housed the evaporator 60. A hermetically sealed pump 61 is also indicated as mounted upon one of the walls of the casing 51. Louvered openings are indicated to provide ingress and egress of the streams of air utilized in this form of the apparatus.

The inventors claim:

In a heating and cooling device adapted to be mounted at an opening of an exterior wall: a housing having a heat insulating partition dividing the housing into two separate spaces; an evaporator in one of the spaces; an absorber and a condenser in the other of the spaces; said housing having a pair of openings for each space; all of said openings being adapted to open peripherally of the housing at the opening of the wall; and a flap valve for each opening adapted to be pivotally supported by the edge of the wall opening about an axis spaced from the housing for selectively establishing communication of the corresponding opening with opposite sides of the wall.

References Cited in the file of this patent
UNITED STATES PATENTS

| | | |
|---|---|---|
| 1,942,295 | Kerr et al. | Jan. 2, 1934 |
| 2,142,960 | Zellhoefer | Jan. 3, 1939 |
| 2,149,947 | Zellhoefer | Mar. 7, 1939 |
| 2,364,287 | Gould | Dec. 5, 1944 |
| 2,391,151 | Gibson | Dec. 18, 1945 |
| 2,401,560 | Graham | June 4, 1946 |
| 2,405,411 | Dybvig | Aug. 6, 1946 |
| 2,498,661 | Dybvig | Feb. 28, 1950 |
| 2,559,217 | Kehoe | July 3, 1951 |
| 2,664,000 | Smith | Dec. 29, 1953 |